(12) United States Patent
Beer

(10) Patent No.: US 10,435,073 B2
(45) Date of Patent: Oct. 8, 2019

(54) METHOD FOR OPERATING A STEERING SYSTEM AND STEERING SYSTEM

(71) Applicant: Robert Bosch Automotive Steering GmbH, Schwäbisch Gmünd (DE)

(72) Inventor: Florian Beer, Schwäbisch Gmünd (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 193 days.

(21) Appl. No.: 15/562,442

(22) PCT Filed: Feb. 2, 2016

(86) PCT No.: PCT/EP2016/052143
§ 371 (c)(1),
(2) Date: Sep. 28, 2017

(87) PCT Pub. No.: WO2016/155914
PCT Pub. Date: Oct. 6, 2016

(65) Prior Publication Data
US 2018/0086379 A1    Mar. 29, 2018

(30) Foreign Application Priority Data

Mar. 30, 2015    (DE) .................. 10 2015 104 860

(51) Int. Cl.
*B62D 6/00*        (2006.01)
*B62D 15/02*       (2006.01)
(Continued)

(52) U.S. Cl.
CPC ........... *B62D 15/025* (2013.01); *B60W 30/06* (2013.01); *B60W 30/09* (2013.01);
(Continued)

(58) Field of Classification Search
CPC .... B62D 15/025; B62D 5/0463; B62D 6/001; B62D 5/04; B62D 6/00; B60W 30/18163; B60W 30/09; B60W 30/06
(Continued)

(56) References Cited

U.S. PATENT DOCUMENTS

2009/0084616 A1* 4/2009 Kezobo ............... B62D 5/0463
                                                180/6.44
2012/0029773 A1* 2/2012 Fujita .................. B60W 30/12
                                                701/41
(Continued)

FOREIGN PATENT DOCUMENTS

DE         101 57 666 A1    6/2003
DE     10 2010 032 043 A1   1/2012
(Continued)

OTHER PUBLICATIONS

International Search Report corresponding to PCT Application No. PCT/EP2016/052143, dated May 10, 2016 (German and English language document) (5 pages).

*Primary Examiner* — Shardul D Patel
(74) *Attorney, Agent, or Firm* — Maginot, Moore & Beck LLP

(57) ABSTRACT

The disclosure relates to a method for operating a steering system of a motor vehicle having a power steering system. A support torque is introduced into a steering transmission. A driving situation is determined. The support torque is reduced depending on the driving situation.

12 Claims, 3 Drawing Sheets

(51) Int. Cl.
- *B60W 30/06* (2006.01)
- *B60W 30/09* (2012.01)
- *B60W 30/18* (2012.01)
- *B62D 5/04* (2006.01)

(52) U.S. Cl.
CPC ..... *B60W 30/18163* (2013.01); *B62D 5/0463* (2013.01); *B62D 6/001* (2013.01); *B62D 5/04* (2013.01); *B62D 6/00* (2013.01)

(58) Field of Classification Search
USPC .... 701/1, 36, 37, 41, 42, 45, 48, 70, 82, 90; 310/44; 180/446; 318/400.02; 348/148
See application file for complete search history.

(56) References Cited

U.S. PATENT DOCUMENTS

| | | | |
|---|---|---|---|
| 2015/0203119 A1* | 7/2015 | Bird | B60W 50/082 701/37 |
| 2015/0203123 A1* | 7/2015 | Darnell | B60W 50/082 701/37 |
| 2015/0298722 A1* | 10/2015 | Witte | B62D 5/04 180/407 |
| 2015/0314804 A1* | 11/2015 | Aoki | B62D 5/0463 701/43 |
| 2016/0001811 A1* | 1/2016 | Endo | B62D 5/0466 701/41 |
| 2016/0129938 A1* | 5/2016 | Okuda | B60W 50/10 701/41 |
| 2016/0137201 A1* | 5/2016 | Okuda | B60W 10/18 701/41 |
| 2016/0159388 A1* | 6/2016 | Sekiya | B62D 5/0409 180/446 |
| 2016/0221575 A1* | 8/2016 | Posch | B60W 50/0098 |

FOREIGN PATENT DOCUMENTS

| | | |
|---|---|---|
| DE | 10 2010 045 518 A1 | 3/2012 |
| DE | 10 2010 062 499 A1 | 6/2012 |
| DE | 10 2012 004 040 A1 | 9/2012 |
| DE | 10 2012 008 230 A1 | 11/2012 |
| DE | 10 2012 021 436 A1 | 4/2014 |

* cited by examiner

METHOD FOR OPERATING A STEERING SYSTEM AND STEERING SYSTEM

This application is a 35 U.S.C. § 371 National Stage Application of PCT/EP2016/052143, filed on Feb. 2, 2016, which claims the benefit of priority to Serial No. DE 10 2015 104 860.4, filed on Mar. 30, 2015 in Germany, the disclosures of which are incorporated herein by reference in their entirety.

The disclosure relates to a method for operating a steering system and to a steering system.

DE 20 10 062 499 A1 discloses a method for functional monitoring of a steering system in a vehicle. A state variable of the steering system is transmitted from a steering control device to a vehicle auxiliary device in which a fault signal is generated if the state variable is outside a defined value range. The fault signal is used to degrade the steering functionality in the steering system.

The object of the disclosure is, on the hand, to ensure the operational safety of the motor vehicle and, on the other hand, to provide the driver with assistance torque.

The object is achieved by means of a method according to the disclosure and by means of a steering system according to the disclosure Advantageous developments are specified in the embodiments. Important features for the disclosure can also be found in the following description and in the drawings, wherein the features can be important both alone and in different combinations for the disclosure without reference being explicitly made thereto once more.

As a result of the fact that an assistance torque is reduced as a function of a driving situation the assistance torque can be made available to the driver of the vehicle degraded as a function of the driving situation.

In one advantageous embodiment, a safety-critical driving situation is determined. The reduction of the assistance torque is deactivated as a function of the safety-critical driving situation. It is therefore possible, for example, for permanently active functions which bring about a permanent reduction in the assistance torque to be deactivated at least for a short time during the safety-critical driving situation. The safety-critical driving situations such as, for example, a planned lane change or upward transgression of a threshold value can therefore be reliably and effectively coped with by the driver of the vehicle by means of a steering speed.

In one particularly advantageous embodiment, a first assistance torque is introduced in each case into the steering gear by means of a first actuator path and by means of a second actuator path in a normal operating mode. A failure of the first actuator path is determined. A second assistance torque is reduced in comparison with the first assistance torque. The second assistance torque is introduced into the steering gear by means of the second actuator path during the failure. By reducing the second assistance torque in comparison with the first assistance torque it is advantageously possible to ensure that the driver retains control over the vehicle even in the event of a failure of the second actuator path. As a result of the reduction to the second assistance torque, a switch-off pulse which would be brought about by the failure of the second actuator path is limited in such a way that it can still be controlled by the driver. If, on the other hand, 100 percent of the first assistance torque were provided by means of the second actuator path, the degree of change in the direction of travel in the event of a loss of the second actuator path would be so large that the vehicle would no longer be able to be controlled further by the driver. Overall, the controllability, in particular of heavy vehicles, is therefore advantageously ensured even in the event of a failure of a partial system.

In one advantageous embodiment, a non-safety-critical driving situation, such as for example a parking situation, is determined. The reduction of the second assistance torque is deactivated during the failure and in the non-safety-critical driving situation. As a result, maneuvering or parking, in particular of heavy vehicles, is advantageously made possible by means of a sufficient assistance torque.

In one advantageous embodiment, a safety-critical driving situation, such as for example a planned lane change or high steering dynamics, is determined. The reduction of the second assistance torque is deactivated during the failure and in the safety-critical driving situation. Even in the event of a failure of the first actuator path, the controllability can therefore also advantageously be ensured in safety-critical driving situations. This embodiment can be executed, in particular, even by means of a power steering system which is not of redundant design, that is to say which only comprises one actuator path.

In one advantageous embodiment, the reduction of the second assistance torque in comparison with the first assistance torque is activated during the failure of the first actuator path if a vehicle speed has exceeded a threshold value and low steering dynamics are present. This advantageously ensures that when a high vehicle speed and/or low steering dynamics are present the assistance torque remains reduced.

Further features, application possibilities and advantages of the disclosure can be found in the following description of exemplary embodiments of the disclosure which are illustrated in the figures of the drawing. The same reference symbols are used for functionally equivalent variables and features in all the figures, even in different embodiments.

BRIEF DESCRIPTION OF THE DRAWINGS

Exemplary embodiments of the disclosure are explained below with reference to the drawing, in which.

DETAILED DESCRIPTION

Figure 1:
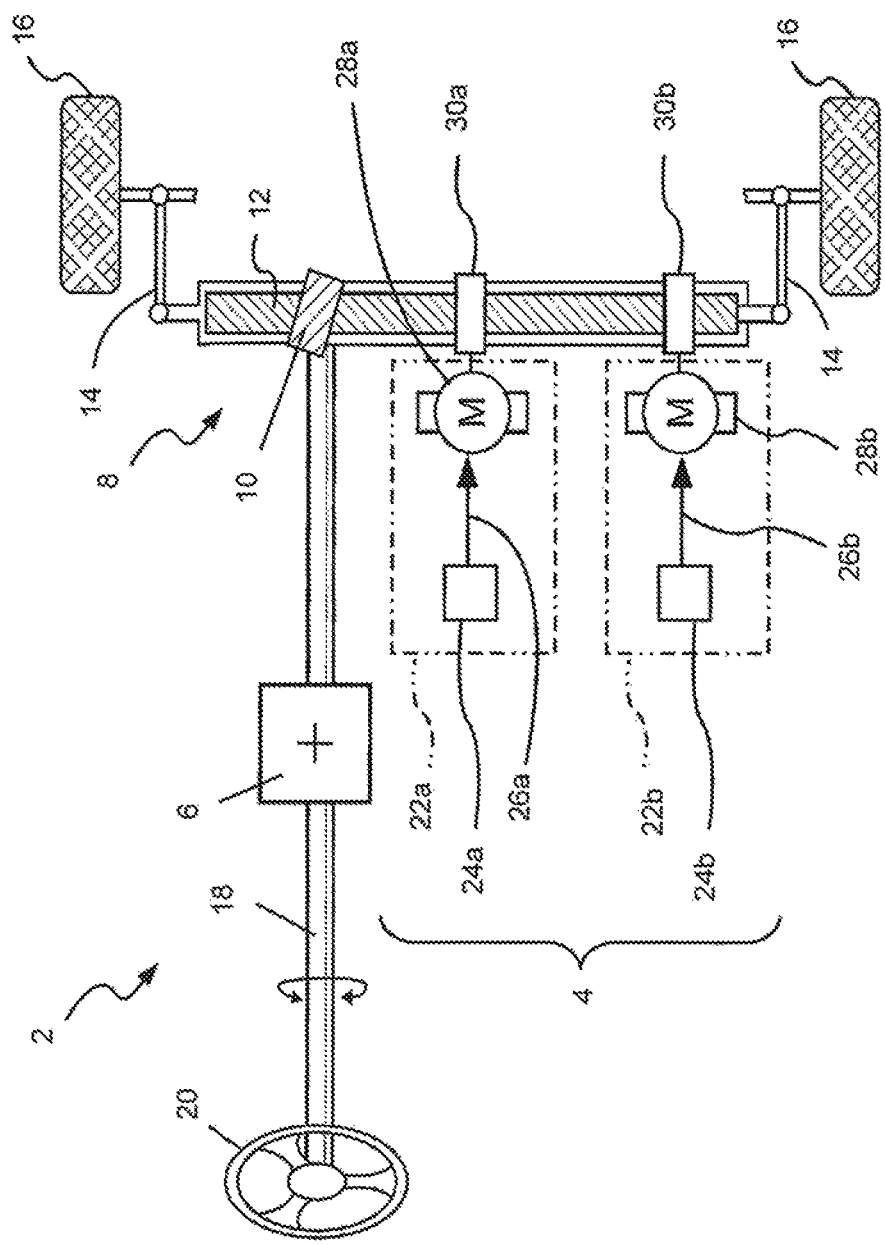
FIG. 1 shows a steering system in a schematic form.

FIG. 1 shows a steering system 2 with a power steering system 4 in a schematic form. Furthermore, the steering system 2 can also comprise a superimposition steering system 6. The steering system 2 has a steering gear 8 which is embodied, for example, as a steering rack steering gear. The steering gear 8 can also be embodied as a recirculating ball gear or a ball and nut gear. In this description, a steering rack steering system is mainly taken as the basis. The steering gear 8 is connected via a pinion 10 and a steering rack 12 on each vehicle side to a steering linkage 14 which respectively interacts with a wheel 16. Basically, the steering system 2 in FIG. 1 constitutes one of a multiplicity of possible embodiments devices which are suitable for carrying out the method according to the disclosure. Other embodiments can be embodied, for example, by other steering gears or by another arrangement of drives. In addition, further sensors may be arranged in the steering system, the arrangement and embodiment of which is not described at this point.

A steering means 20, for example a steering wheel, is arranged on a torsion bar 18. The steering means angle which is applied by the vehicle driver as far as the steering gear 8 can be increased or decreased by means of the superimposition steering system 6. This steering means difference which is introduced into the steering gear 8 by the superimposition steering system 6 is also referred to as an additional steering angle. Of course, instead of the torsion bar it is also possible to arrange a steering column between the steering means 20 and the superimposition steering system 6. In this embodiment, the torsion bar is arranged between the superimposition steering system 6 and the power steering system 4 or the steering gear 8.

The power steering system 4 comprises a first actuator path 22*a* and a second actuator path 22*b*. The actuator paths 22 are essentially of the same design and each comprise a control device 24 which transmits a desired assistance torque 26 to a motor 28. The motor 28 inputs the supplied assistance torque 26 into the steering gear 8 via a gear mechanism 30 and the steering rack 12 as a function of said supplied assistance torque 26. The steering gear 8 correspondingly comprises a pinion 10, the gear mechanisms 30*a* and 30*b* and the steering rack 12. The control device 24*a*, 24*b* has in each case a processor unit which is connected via a data line to a memory element. The processor unit can also be referred to as a digital computing device on which the methods described here can be executed. The memory element can also be referred to as a memory medium on which a computer program which is to be executed on the processor unit is stored.

The actuator paths 22*a* and 22*b* can of course also be embodied in different ways. In FIG. 1 there are two actuator paths 22 which are independent in terms of the control device 24 and motor 28 and extend to just the before the respective gear mechanisms 30. In another embodiment of the steering system 2, for example just one control device can be present which provides the respective assistance torque 26 for two motors 28. Mixed forms are also conceivable in which, for example, a superordinate control device communicates with two subordinate control devices of redundant design. In this context, the subordinate control devices would be comparable with the control devices 24*a* and 24*b*.

Figure 2:
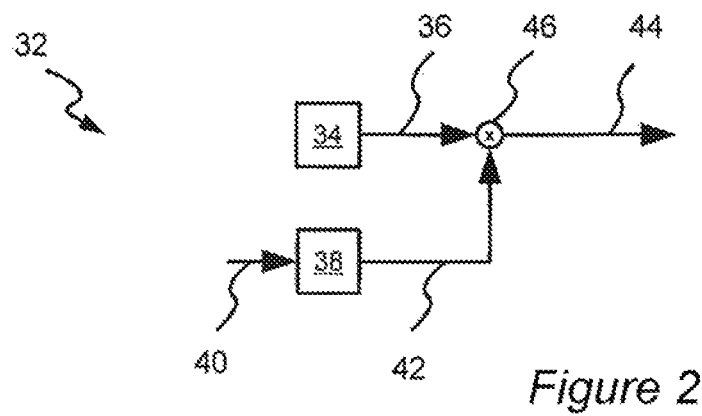
FIGS. 2 and 4 each show a schematic block diagram.

FIG. 2 shows a schematic block diagram 32 which can be, for example, in each case part of the control devices 24*a* and 24*b*. A block 34 generates, for example as a function of input variables such as a manual torque, a vehicle speed and/or further variables, a first assistance torque 36 which is introduced into the steering gear 8 during the normal operation, for example by, in each case, one of the actuator paths 22. A block 38 determines a factor 42 with a value between 0 and 1 as a function of a driving situation 40. A second assistance torque 44 arises from the multiplication at the multiplication point 46 of the first assistance torque 36 by the factor 42. If the factor 42 is smaller than 1, the second assistance torque 44 is reduced in comparison with the first assistance torque 36. This reduction is also referred to as degrading.

Figure 3:
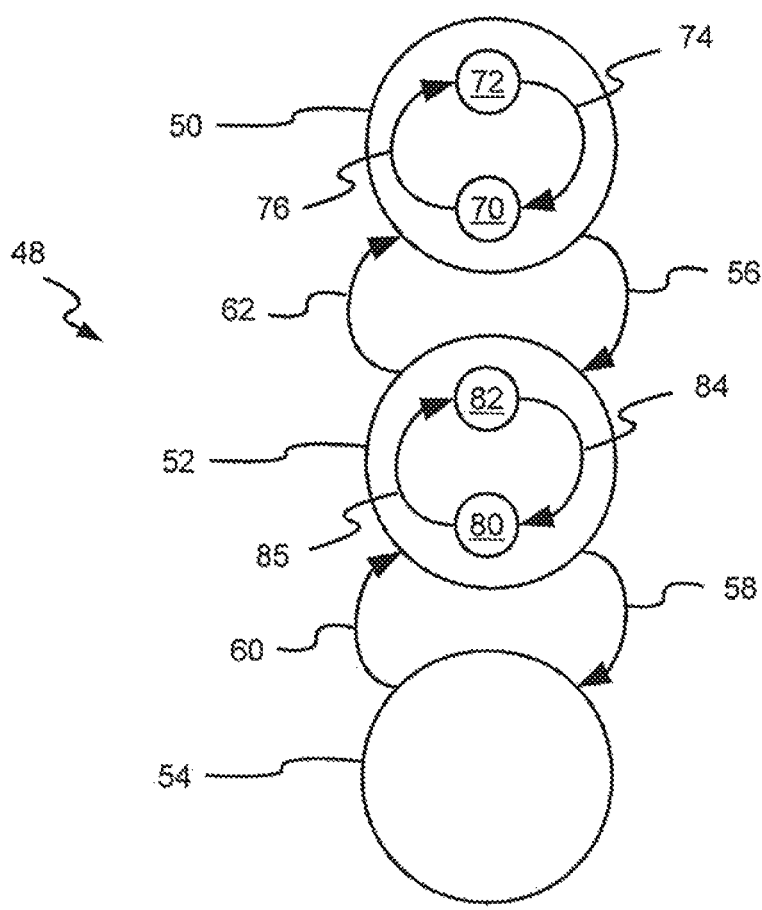
FIG. 3 shows a schematic state transition diagram.

FIG. 3 shows a schematic state transition diagram 48. A normal state 50, a first failure state 52 and a second failure state 54 are shown. In the normal state 50, both actuator paths 22*a* and 22*b* function essentially satisfactorily. In the second failure state 52, which is generally also referred to as a failure, the first actuator path 22*a* has failed. Therefore, in the first failure state 52 the first actuator path 22*a* does not introduce any assistance torque into the steering gear 8, as a result of which the assistance torque introduced into the steering gear 8 by the power steering system 4 is basically reduced by half in comparison with the normal state 50. The second failure state 54 comprises a failure both of the first actuator path 22*a* and of the second actuator path 22*b*.

Accordingly, when the failure of the first actuator path 22*a* occurs there is a changeover into the first failure state 52 according to an arrow 56. If, in addition to the first actuator path 22*a*, the second actuator path 22*b* also fails, there is a changeover into the second failure state 54 according to the arrow 58. Optionally, according to arrows 60 and 62 there can be a changeover into the states 52 and 50 when the functional capability of the respective actuator paths 22*a*, 22*b* returns.

The normal state 50 comprises a degradation state 70 in which the assistance torque 44 is reduced, and a deactivation state 72 in which the reduction is deactivated from the degradation state 70. When there is a return into the degradation state 70, the reduction of the assistance torque 44 is activated again. If, for example, a high temperature is detected in the steering system 2 during the normal state 50, there is a changeover into the degradation state 70 according to an arrow 74. If a safety-critical driving situation such as, for example, a planned sudden lane change or an upward transgression of a threshold value by a steering speed is determined in the degradation state 70, there is changeover into the deactivation state 72, as a result of which the reduction of the assistance torque 44 is deactivated as a function of the safety-critical situation. In accordance with the deactivation state 72, functions which reduce the assistance torque 44 in a non-safety-critical driving situation are suppressed in the safety-critical driving situation, in order to provide the driver of the vehicle with sufficient steering assistance to control the safety-critical driving situation.

In the first failure state 52, the steering system 2 can be either in a further degradation state 80, in which the assistance torque is reduced, or in a deactivation state 82, in which the reduction of the assistance torque is deactivated. If there is a high vehicle speed present, according to the arrow 84, there a changeover into the degradation state 80 in which the assistance torque which has been introduced into the steering gear 8 and has already been reduced by half by the failure of the first actuator path 22*a*, is reduced further, for example to 60% of the assistance torque 36, in order to reduce the impulse which the driver of the vehicle would feel at the steering wheel when the second actuator path 22*b* fails. If, on the other hand, a low speed, for example below 12 km/h, is present and a high steering speed or another safety-critical driving situation is present, there is changeover into the deactivation state 82 according to an arrow 85, in order to provide the driver of the vehicle with sufficient steering assistance at least for a short time as a result of no reduction.

Deactivation of the reduction of the assistance torque comprises a withdrawal of the reduction which can be sensed by the driver. Activation of the reduction of the assistance torque comprises a reduction in the assistance torque, which can be sensed by the driver.

Figure 4:
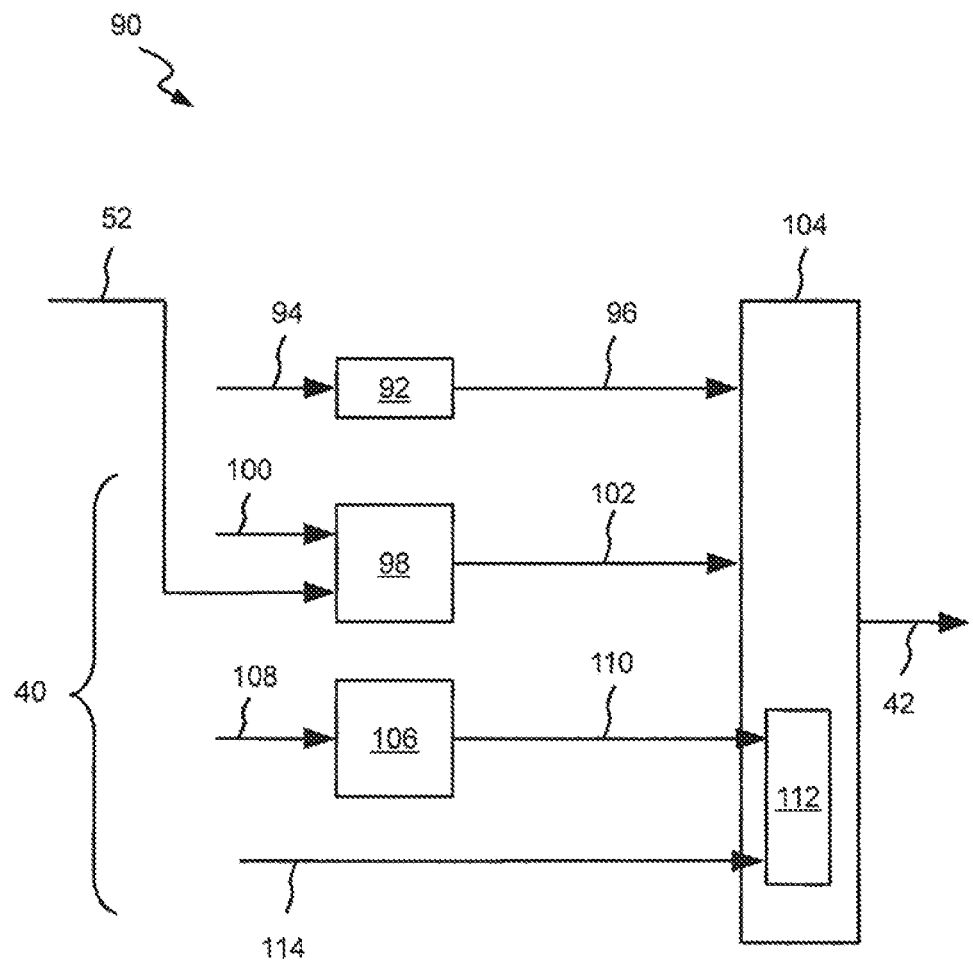

FIG. 4 shows a schematic block diagram 90. A block 92 determines, as a function of a system temperature 94, a reduction factor 96 which is between 0 and 1 or is 0 or 1. The system temperature 94 is measured in the region of an actuator path 22.

A block 98 determines, as a function of a vehicle speed 100, a further reduction factor 102 which is 0 or 1 or between 0 and 1. If, for example, the vehicle speed 100 is below 12 km/h, the reduction factor 102 is determined as 1, and therefore the assistance torque 44 is not reduced. If the vehicle speed 100 is above 12 km/h, the reduction factor 102 is determined as, for example, 0.6. The block 98 is active only if the steering system 2 is in the first failure state 52.

A block 104 passes on the smallest of the supplied reduction factors 96, 102 as a factor 42. Of course, further reduction factors (not shown) can also be supplied to the block 104.

A block 106 determines, as a function of a steering speed 108, a first deactivation signal 110 which is supplied to a deactivation block 112 within the block 104. Furthermore, a second deactivation signal 114 is supplied to the deactivation block 112. The block diagram 90 is part of the respective control device 24a and 24b. The second deactivation signal 114 can be supplied by a further control device which differs from the control devices 24a and 24b. For example, the deactivation signal 114 comprises the detection of a safety-critical driving situation, such as for example a planned lane change in the sense of the moose test. If one of the deactivation signals 110 and 114 is active, the deactivation block 112 deactivates the reduction of the assistance torque 44 which is introduced into the steering gear 8 in that the deactivation block 112 determines the factor 42 as 1 independently of the supplied reduction factors 102, 96.

The invention claimed is:

1. A method for operating a steering system of a motor vehicle having a power steering system, the method comprising:
   introducing an assistance torque into a steering gear;
   determining a driving situation;
   reducing the assistance torque as a function of the driving situation;
   introducing a first assistance torque in each case into the steering gear using a first actuator path and using a second actuator path in a normal operating mode;
   determining a failure of the first actuator path;
   reducing a second assistance torque in comparison with the first assistance torque; and
   introducing the second assistance torque into the steering gear using the second actuator path during the failure of the first actuator path.

2. The method as claimed in claim 1, further comprising:
   determining a safety-critical driving situation; and
   deactivating the reduction of the assistance torque as a function of the safety-critical driving situation.

3. The method as claimed in claim 2, wherein the safety-critical driving situation is one of (i) a planned lane change and (ii) a steering speed exceeding a threshold value.

4. The method as claimed in claim 1, further comprising:
   determining a non-safety-critical driving situation; and
   deactivating the reduction of the second assistance torque during the failure of the first actuator path and in the non-safety-critical driving situation.

5. The method as claimed in claim 4, further comprising:
   activating the reduction of the second assistance torque in comparison with the first assistance torque during the failure of the first actuator path in response to at least one of (i) a vehicle speed exceeding a threshold value and (ii) low steering dynamics being present.

6. The method as claimed in claim 4, wherein the non-safety-critical driving situation is a parking situation.

7. The method as claimed in claim 1, further comprising:
   determining a safety-critical driving situation; and
   deactivating the reduction of the second assistance torque during the failure of the first actuator path and in the safety-critical driving situation.

8. The method as claimed in claim 7, wherein the safety-critical driving situation is one of (i) a planned lane change and (ii) high steering dynamics.

9. A non-transitory computer readable medium configured to store computer program for operating a steering system of a motor vehicle having a power steering system, the computer program being configured to, when executed on a digital computing device:
   introduce an assistance torque into a steering gear; determine a driving situation; reduce the assistance torque as a function of the driving situation; introduce a first assistance torque in each case into the steering gear using a first actuator path and using a second actuator path in a normal operating mode; determine a failure of the first actuator path; reduce a second assistance torque in comparison with the first assistance torque; and introduce the second assistance torque into the steering gear using the second actuator path during the failure of the first actuator path.

10. The non-transitory computer readable medium as claimed in claim 9, wherein the computer program is configured to be executed on a microprocessor of a control device configured to operate the steering system of the motor vehicle.

11. A steering system of a motor vehicle, the steering system comprising:
   a power steering system, wherein an assistance torque is can be introduced into a steering gear, wherein a driving situation is determined and the assistance torque is reduced as a function of the driving situation, wherein a first assistance torque is introduced in each case into the steering gear using a first actuator path and using a second actuator path in a normal operating mode, wherein a failure of the first actuator path is determined, wherein a second assistance torque is reduced in comparison with the first assistance torque, and wherein the second assistance torque is introduced into the steering gear using the second actuator path during the failure of the first actuator path.

12. The steering system as claimed in claim 11, further comprising:
   a control device configured to:
      introduce the assistance torque into the steering gear;
      determine the driving situation;
      reduce the assistance torque as the function of the driving situation;
      introduce the first assistance torque in each case into the steering gear using the first actuator path and using the second actuator path in the normal operating mode;
      determine the failure of the first actuator path;
      reduce the second assistance torque in comparison with the first assistance torque; and
      introduce the second assistance torque into the steering gear using the second actuator path during the failure of the first actuator path.

* * * * *

UNITED STATES PATENT AND TRADEMARK OFFICE
CERTIFICATE OF CORRECTION

PATENT NO.        : 10,435,073 B2
APPLICATION NO.   : 15/562442
DATED             : October 8, 2019
INVENTOR(S)       : Florian Beer Page 1 of 1

It is certified that error appears in the above-identified patent and that said Letters Patent is hereby corrected as shown below:

In Claim 11, at Column 6, Lines 30-31, the words "can be" between the word "is" and the word "introduced" should be deleted.

Signed and Sealed this
Twenty-first Day of January, 2020

Andrei Iancu
*Director of the United States Patent and Trademark Office*